(No Model.)
W. F. VALENTINE.
TWO WHEELED VEHICLE.
No. 526,952. Patented Oct. 2, 1894.
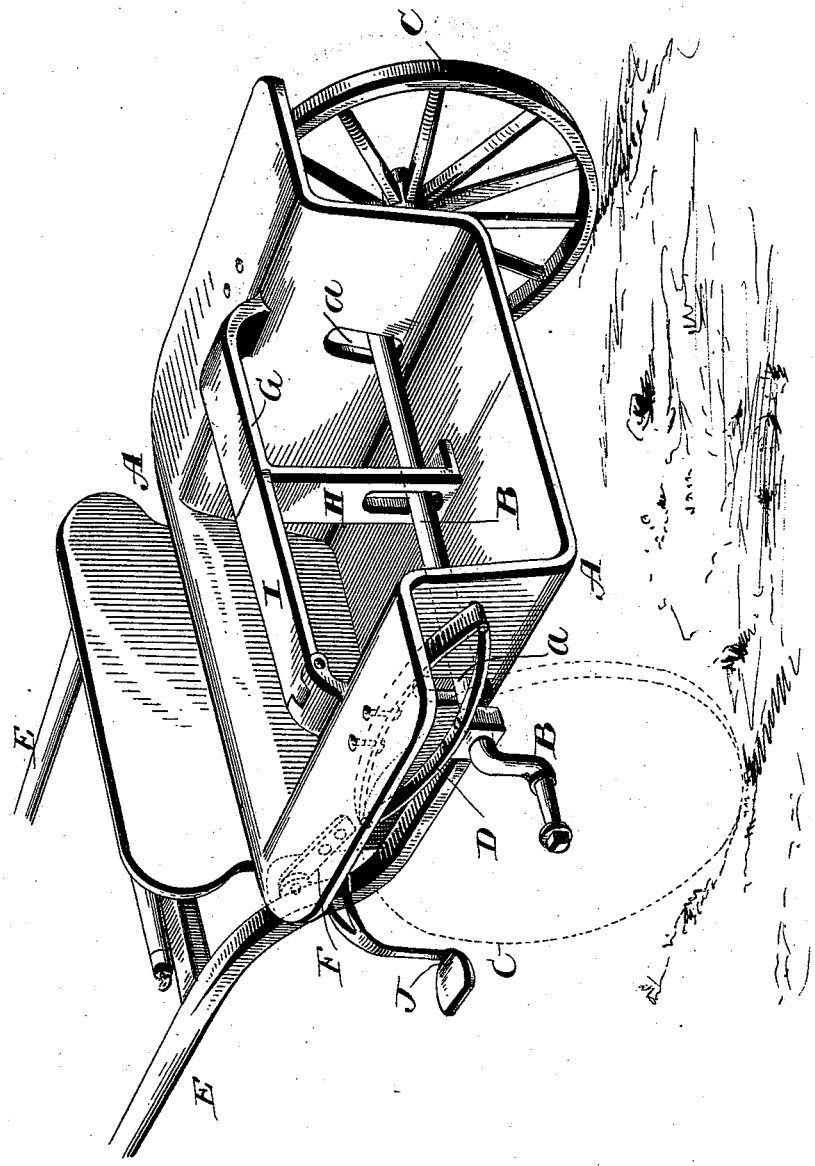

UNITED STATES PATENT OFFICE.

WILLIAM F. VALENTINE, OF CIRCLEVILLE, OHIO.

TWO-WHEELED VEHICLE.

SPECIFICATION forming part of Letters Patent No. 526,952, dated October 2, 1894.

Application filed January 10, 1894. Serial No. 496,416. (No model.)

*To all whom it may concern:*

Be it known that I, WILLIAM F. VALENTINE, a citizen of the United States, residing at Circleville, in the county of Pickaway and State of Ohio, have invented certain new and useful Improvements in Carts for Use in Breaking Colts; and I do declare the following to be a full, clear, and exact description of the invention, such as will enable others skilled in the art to which it appertains to make and use the same, reference being had to the accompanying drawing, and to the letters of reference marked thereon, which forms a part of this specification.

My invention relates to two wheeled carts, and has for its object the provision of a cart of this character adapted more especially for the purpose of training or breaking in horses, the aim being to enable access or entrance to the cart to be easy and safe and to make its occupancy as safe and free from danger as possible.

To this and other ends the invention consists in the cart having the construction hereinafter specified and claimed and illustrated in the drawing which shows a perspective view thereof.

A in the drawing designates the body or box part of my cart which has its two sides and front, but not its rear end closed. The floor of said body lies in a plane below the main portion of the axle B which axle passes through openings a, a in the sides of the body and has its ends outside of the latter dropped or bent downward. The wheels C, are journaled on said ends, and they are preferably of comparatively small diameter so that the floor of the body or box A, will be lower by reason of this as well as by being below the main part of the axle, and thus make it easy to step in and out of the cart with safety even though in motion and with an unmanageable animal.

The sides of the box A are carried horizontally outward over the tops of the wheels to form guards to prevent a person from getting caught or entangled in the wheels should it be thrown sidewise. The box is attached to the axle by an ordinary elliptical spring D at each side as shown, and to permit its vertical movement, the openings a a through which the axle passes are slotted vertically.

Thills or shafts E, of usual construction are fastened to the axle, and to them the body A is pivotally attached at its front by a bar or extension F at each side that is connected to the adjacent thill.

A seat is provided extending from one side of the cart to the other, which consists of a fixed or stationary shaft G that is supported at the center of the body by an upright or post H rising from the floor thereof, and a movable half I that is hinged at its outer end to the body side. The object of thus constructing the seat is to avoid the necessity of climbing over the seat when the entrance is at the rear of the cart and thus add to the safety of the same.

An ordinary step J is attached to each side of the body A at the front to enable one to get in or out at this point if found desirable.

Besides being very useful and efficient for the especial purpose for which it has been designed, as has been found by actual trial, my cart is of course useful and desirable for pleasure or other purposes.

Having thus described my invention, what I claim to be new, and desire to secure by Letters Patent, is—

In a cart for use in training colts, the combination of the body portion closed at its end and sides, a crank axle which works in slots in the sides of the said body, springs secured to a bearing of the axle and to horizontal extensions of the body, for supporting the same, a seat integral with and extending across the body portion, and provided with a lift gate, and the central slotted seat support H, all substantially as shown and described.

In testimony whereof I affix my signature in presence of two witnesses.

WILLIAM F. VALENTINE.

Witnesses:
CHARLES DRESBACH,
WEALTHA E. VIETH.